United States Patent
Fallowes et al.

(10) Patent No.: US 7,314,308 B2
(45) Date of Patent: Jan. 1, 2008

(54) MIXING BOWL WITH ATTACHMENT

(76) Inventors: Gary Fallowes, 5949 Dirac St., San Diego, CA (US) 92122; William Tan, 21 Li Hwan Close, Singapore (SG) 557144; David Robert Goetz, 676 S. Ave. 21, Suite 400, Los Angeles, CA (US) 90031

( * ) Notice: Subject to any disclaimer, the term of this patent is extended or adjusted under 35 U.S.C. 154(b) by 485 days.

(21) Appl. No.: 11/085,741

(22) Filed: Mar. 21, 2005

(65) Prior Publication Data
US 2006/0209629 A1 Sep. 21, 2006

(51) Int. Cl.
*B01F 9/12* (2006.01)
*B01F 9/16* (2006.01)
(52) U.S. Cl. .................. 366/310; 366/313; 366/343
(58) Field of Classification Search ........... 366/313, 366/310, 312, 343, 342; 99/348
See application file for complete search history.

(56) References Cited

U.S. PATENT DOCUMENTS

| | | | |
|---|---|---|---|
| 60,330 A | 12/1866 | Brand et al. ............... | 366/162.5 |
| D55,815 S | 7/1920 | Pinkey ....................... | D15/147 |
| 1,826,242 A * | 10/1931 | Dehuff ........................ | 366/343 |
| 2,027,756 A * | 1/1936 | Tay ............................. | 366/195 |
| 2,178,269 A * | 10/1939 | Seybert ....................... | 366/313 |
| 2,181,078 A * | 11/1939 | Dehuff ........................ | 366/309 |
| D119,842 S | 4/1940 | Anstice ....................... | D15/147 |
| D134,247 S | 11/1942 | Moeller ....................... | D15/147 |
| 2,318,534 A * | 5/1943 | Seybert ....................... | 366/312 |
| 3,415,497 A * | 12/1968 | Clarence ..................... | 366/247 |
| 3,914,956 A * | 10/1975 | Knight, Jr. .................. | 62/343 |
| 4,337,000 A * | 6/1982 | Lehmann ..................... | 366/288 |
| 4,525,072 A * | 6/1985 | Giusti ....................... | 366/171.1 |
| 4,613,086 A * | 9/1986 | Granum et al. ........... | 241/101.8 |
| 4,854,717 A * | 8/1989 | Crane et al. ................ | 366/197 |
| 4,944,600 A * | 7/1990 | McKelvey ................... | 366/142 |
| 4,946,285 A * | 8/1990 | Vennemeyer ............... | 366/288 |
| 5,556,201 A * | 9/1996 | Veltrop et al. .............. | 366/203 |
| 5,568,976 A * | 10/1996 | Gabriele ...................... | 366/312 |
| D421,030 S | 2/2000 | Panaccione et al. ....... | D15/147 |
| D488,956 S * | 4/2004 | Boyle et al. ................ | D7/412 |
| 6,932,503 B2 * | 8/2005 | Fallowes ..................... | 366/309 |
| 2004/0240313 A1 | 12/2004 | Fallowes ................... | 366/162.5 |
| 2006/0171251 A1* | 8/2006 | Busick ....................... | 366/312 |
| 2006/0268659 A1* | 11/2006 | Kaas ........................... | 366/312 |

\* cited by examiner

*Primary Examiner*—Tony G. Soohoo
(74) *Attorney, Agent, or Firm*—John L. Rogitz

(57) ABSTRACT

A food mixing attachment includes two mixing arms extending down from an engagement member that is configured for engaging a mixer. A respective flexible blade is on each arm and has a contour generally like that of a bowl. During the mixing process the blades scrape food from the bowl surface into the interior of the bowl.

11 Claims, 2 Drawing Sheets

MIXING BOWL WITH ATTACHMENT

FIELD OF THE INVENTION

The present invention relates generally to mixing bowl attachments.

BACKGROUND OF THE INVENTION

Food mixers are present in most kitchens. Many food mixers include a revolving planetary element that has a rotating beater shaft with which an attachment such as a wire whisk or mixing beater can be attached, with the attachment revolving with the planetary element as well as rotating with the shaft. As the planetary element revolves and the attachment rotates, the attachment moves through food constituents in a bowl placed under the planetary element to mix, beat, or otherwise process the food constituents.

As recognized by the present invention, beaters are a type of attachment that can be used to mix food. During the mixing process, the present invention critically recognizes that it is common for some of the food to stick to the side of the bowl and remain there. This requires that the cook stop the food mixer and scrape food from the side of the bowl back into the mixing region. This inconvenience can be particularly common for thicker batters like cheesecake, creaming together butter and sugar or even muffin and cookie dough. In addition to sticking on the sides of the bowl, food tends to build up in the dimpled area at the very bottom of the bowl, which further complicates the sticking problem.

Having made the critical recognitions above, the invention below is provided.

SUMMARY OF THE INVENTION

A mixing attachment for a mixer for mixing food in a bowl having a curved side and a bottom is disclosed. The attachment includes an upper engagement member that is configured for releasably engaging a turning component of the mixer. When the upper engagement member is engaged with the turning component and the mixer is activated, the upper engagement member moves. At least two and in some implementations only two arms depend down from the upper engagement member and are opposed to each other. Each arm includes a respective scraper segment that is contoured generally complementarily to the side of the bowl. Also, in some implementations the arms (and, hence, the below-described blades) are curved in a top-to-bottom dimension defined by the bowl and are also curved in an azimuthal dimension that is orthogonal to the top-to-bottom dimension.

The scraper segments may if desired join each other at a bottom of the attachment, and the bottom of the attachment is juxtaposed with the bottom of the bowl when in operation. A respective resilient blade is engaged with each scraper segment along a substantial part of the length thereof, with the blades being spaced from each other near the bottom of the bowl so that the blades ride only on the sides of the bowl and do not jam or stick on the bottom. In some less preferred embodiments the blades may meet each other at the bottom. When the attachment is engaged with the mixer and the bowl is positioned beneath the turning component of the mixer with the attachment extending into the bowl, the blades ride against the side of the bowl, and/or the blades are closely spaced from the side of the bowl, to scrape food from the side into the interior region of the bowl, where it is mixed.

The blades may be a flexible FDA-approved rubber and the arms may be a plastic such as, e.g., polycarbonate. Or, the arms may be metal. Each arm can be formed with one or more openings, and a portion of the respective blade extends into the opening. Also, each arm may include a respective shoulder segment extending between the upper engagement member and the respective scraper segment. The shoulder segments are substantially horizontal.

In another aspect, a food mixing attachment for a mixer includes at least two mixing arms depending down from an engagement member that is configured for engaging the mixer such that the mixer can move the attachment when the mixer is activated. A respective flexible blade is on each arm and is made separately therefrom. Each blade has a contour generally like at least a portion of a top to bottom contour of a bowl. With this cooperation of structure, the blades scrape food from the bowl surface when the bowl is operably engaged with the mixer, food is in the bowl, the engagement member is engaged with the mixer, and the mixer is activated. The blades are held onto the arms without fasteners.

In still another aspect, a method for making a mixing attachment includes molding a unitary body having at least two arms which assume the contour of at least a portion of a mixing bowl. The body also establishes an engagement member that is configured for engaging a turning component of a food mixer. The method also includes overmolding onto the arms respective flexible scraping blades.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
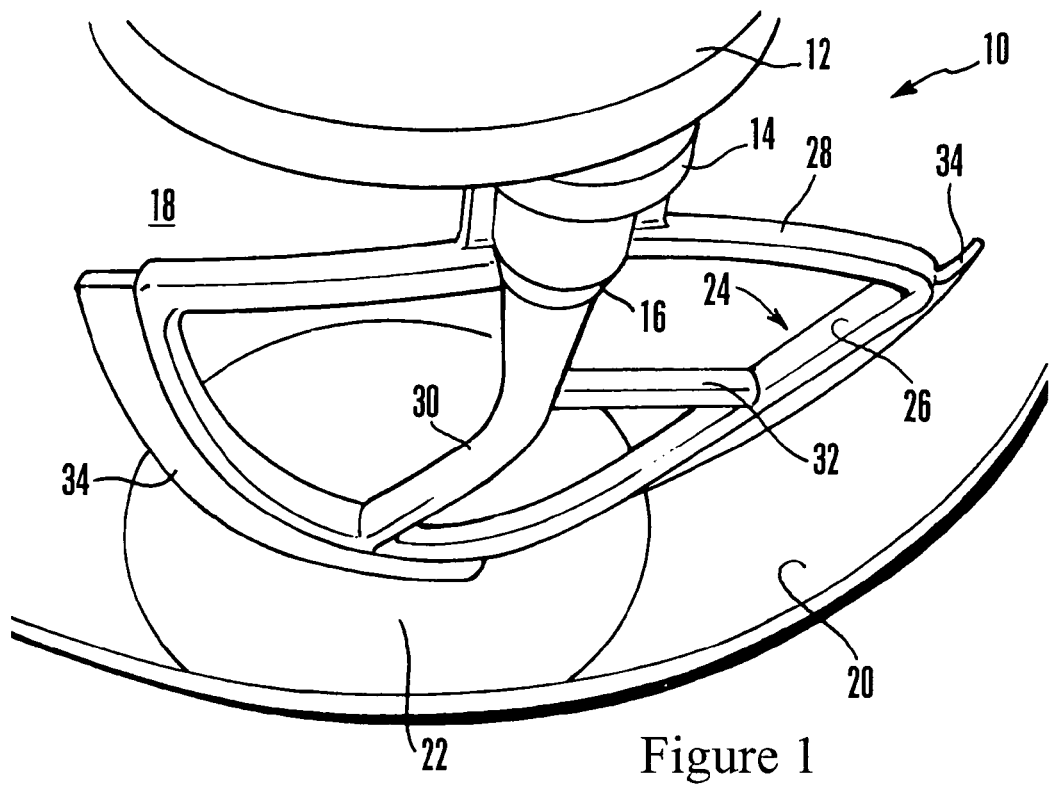
FIG. 1 is a perspective view of an embodiment of the mixer attachment, shown attached to a mixer and depending down into a bowl for scraping food from the sides and bottom of the bowl during food mixing.

Referring initially to FIG. 1, a mixer generally designated 10 includes a turning component 12, such as, e.g., a planetary-type turning element, with which an upper engagement member 14 of a mixing attachment 16 can be releasably engaged in accordance with mixing attachment engagement principles known in the art. The mixer 10 can be activated to move the attachment 16 for mixing food in a bowl 18 that has a side 20 and a bottom 22. In some embodiments the side 20 of the bowl may be substantially cylindrical near the open top of the bowl as shown, and can assume a parabolic-like shape or other curved and/or tapering shape as it tapers down toward the bottom 22 of the bowl 18. In any case, the attachment 16 may be a unitarily-made piece of injection molded plastic that is relatively rigid when formed, such as, e.g., Delrin™ or polycarbonate. Or, it may be metal.

As shown in FIG. 1, the mixing attachment 16 may have two and only two arms 24 that depend down from the upper engagement member 14 and that are opposed to each other, although more arms may be included if desired. Each arm 24 includes a respective scraper segment 26 that, as can readily be appreciated in reference to FIG. 1, is contoured generally complementarily to the side 20 of the bowl 18. Also, the scraper segments 26 may join each other at or near the bottom of the attachment 16 as shown, with the bottom of the attachment being juxtaposed with the bottom 22 of the bowl 18 when the attachment 16 is engaged with the mixer 10 and the bowl 18 is positioned as shown beneath the turning component 12 of the mixer 10 with the attachment 16 extending into the bowl 18.

Additionally, as shown in FIG. 1 each arm 24 can include a respective shoulder segment 28 that extends between the upper engagement member 14 and the respective scraper segment 26. The shoulder segments 28 may be substantially horizontal when the attachment 16 is engaged with the mixer 10 and the bowl 18 is positioned as shown. The attachment 16 may also be formed with a central stem 30 that extends from the upper engagement member 14 down toward the bottom of the attachment, where it joins one of the arms 24. One or more strengthening ribs 32 may extend between the stem 30 and arm 24 as shown, to lend rigidity to the attachment structure.

In accordance with the present invention, at least one of the arms 24 and preferably both of the arms 24 is associated with a respective resilient, preferably rubber (or equivalent flexible plastic) elongated scraping blade 34 that may be made of a material that is FDA approved for food use. More particularly, each blade 34 is engaged with its respective scraper segment 26 substantially along the entire length thereof and, hence, is elongated generally in the vertical dimension during use. Each blade is shaped somewhat like a windshield wiper blade, i.e., each blade is thin, and each blade tapers down in the transverse dimension of the blade from a base that is next to the respective scraper segment 26 to a scraping edge that runs the length of the blade and that faces the side of the bowl when in use.

It may readily be appreciated that the blades 34 conform to at least a portion of the top to bottom contour of the bowl 18. In the embodiment shown in FIG. 1, the blades 34 extend all the way down to the bottom of the attachment 16 and consequently meet each other at the bottom. In this embodiment, the blades 34 periodically (owing to the planetary and rotational action of the mixer) ride against the side 20 and bottom 22 of the bowl 18 when the attachment turns in the bowl, causing the flexible blades 34 to deflect somewhat during periods when they contact the bowl as best shown in the case of the blade 34 in the right of FIG. 1. Because the blades 34 extend to the bottom 22 of the bowl 18, food is scraped from both the side 20 and bottom 22 of the bowl 18 into the center of the bowl 18 during mixing. Or, the blades 34 may be closely spaced from the side 20 of the bowl 18.

Figure 2:
FIG. 2 is a perspective view of an embodiment of the mixer attachment.

FIG. 2 shows a preferred mixing attachment 40 that in all essential respects is identical to the mixing attachment 16 shown in FIG. 1, except that flexible scraping blades 42 extend along most but not all of the lengths of their respective scraping segments 44, such that the blades 42 do not meet each other at the bottom of the attachment 40. Indeed, several millimeters of space 43 may exist between the ends of the blades as shown, so that the blades do not touch each other at the bottom of the bowl during operation, which otherwise could cause the blades to jam or stick. The upper engagement member 46 is shown to be cylindrical with a central keyed bore 48 for closely receiving a beater shaft of the mixer 10 shown in FIG. 1.

Figure 3:
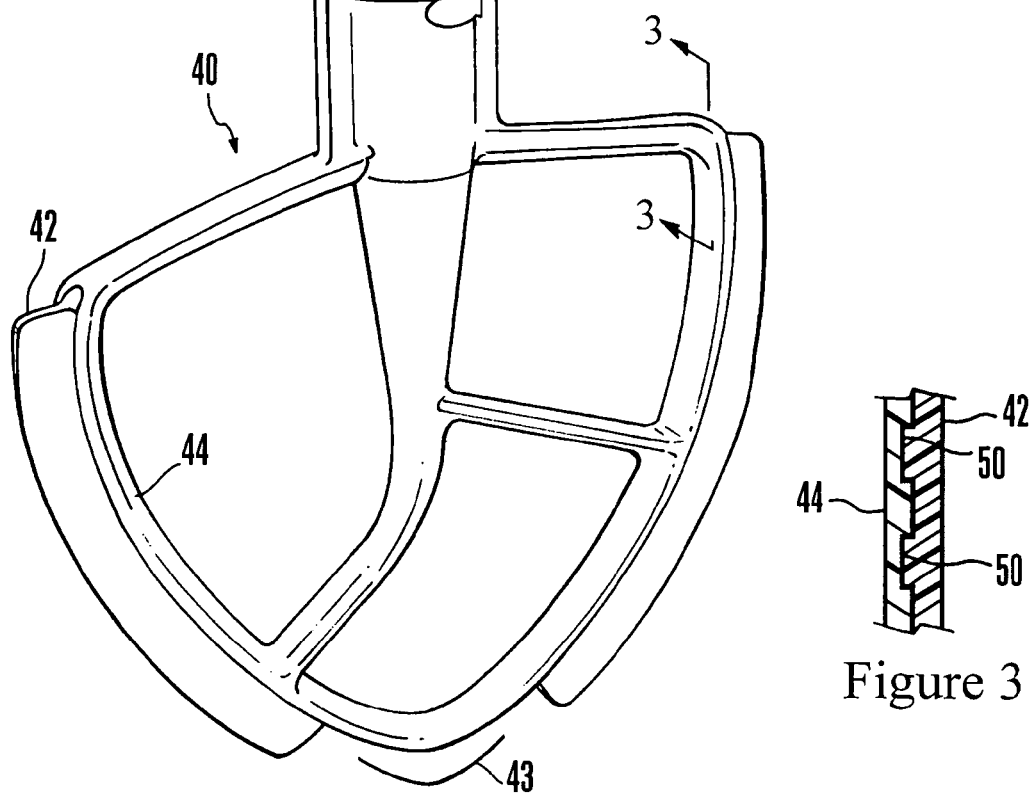
FIG. 3 is a cross-sectional view taken along the line 3-3 in FIG. 2.

In one non-limiting embodiment and referring now to FIG. 3, to make the present mixing attachment the attachment body may first be injection molded or otherwise formed with holes or openings 50. The holes 50 may extend all the way through the scraping segments 44 or only part way through. In any case, after being formed into the configuration shown in FIGS. 1 and 2, the attachment is overmolded with the blade material, which flows into the holes or openings 50 as shown to securely hold the blades 42 onto the segments 44 and which then cools to assume the shape shown in FIG. 2. Thus, no fasteners need be used to hold the blades onto the arms, and in any case once molded to the arms the blades cannot move on the arms.

Figure 4:
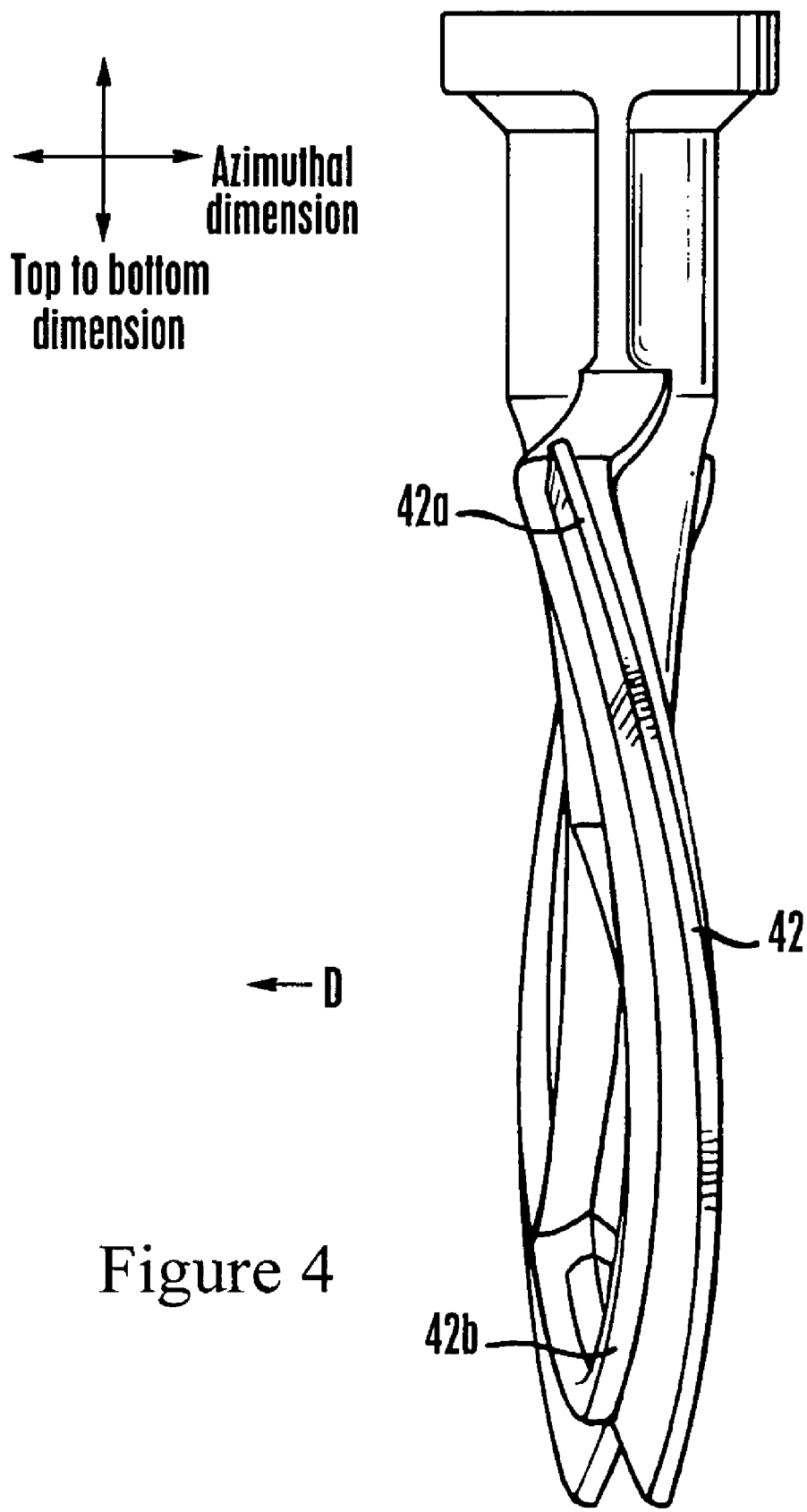
FIG. 4 is a side view of the embodiment shown in FIG. 2.

FIG. 4 best shows that in addition to the above-described blade contour in the top-to-bottom dimension of the bowl, the attachment arms and, hence, the blades of the present invention may be curved in a second dimension, namely, the dimension (referred to herein as the "azimuthal dimension") that is orthogonal to the top-to-bottom dimension of the bowl, as indicated by the labelling in FIG. 4. As shown in FIG. 4, the top-most segment 42a of a blade 42 may be azimuthally ahead of the bottom-most segment 42b, relative to the direction "D" of rotation 100, with the blade 42 being gently curved backward (relative to the direction "D" of rotation), top to bottom and with a slight curve back forward in azimuthal direction near the bottom 42b as shown. A blade with this configuration more effectively pushes food from the side of the bowl into the center of the bowl for better mixing, compared to a blade that is azimuthally straight.

While the particular MIXING BOWL attachment as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A mixing attachment for a mixer for mixing food in a bowl having curved side and a bottom, comprising:

an upper engagement member configured for releasably engaging a turning component of the mixer, such that when the upper engagement member is engaged with the turning component and the mixer is activated, the upper engagement member moves;

two and only two arms depending down from the upper engagement member and opposed to each other, each arm including a respective scraper segment contoured generally complementarily to the side of the bowl, the scraper segments joining each other at a bottom of the attachment, the bottom of the attachment being juxtaposed with the bottom of the bowl when the attachment is engaged with the mixer and the bowl is positioned beneath the turning component of the mixer with the attachment extending into the bowl; and a respective resilient blade engaged with each scraper segment along a substantial length thereof and being spaced from each other at the bottom of the attachment, the blades bearing at least one of the following relationships when the attachment is engaged with the mixer and the bowl is positioned beneath the turning component of the mixer with the attachment extending into the bowl: riding against the side of the bowl, and being closely spaced from the side of the bowl, wherein the arms are curved in a top-to-bottom dimension defined by the bowl and are also curved in an azimuthal dimension that is orthogonal to the top-to-bottom dimension.

2. The attachment of claim 1, wherein the blades are rubber.

3. The attachment of claim 1, wherein the arms are plastic.

4. The attachment of claim 1 wherein each arm is formed with at least one opening, a portion of the respective blade extending into the opening.

5. The attachment of claim 1, wherein each arm includes a respective shoulder segment extending between the upper engagement member and the respective scraper segment, the shoulder segments being substantially horizontal when the attachment is engaged with the mixer and the bowl is positioned beneath the turning component of the mixer with the attachment extending into the bowl.

6. The attachment of claim 1, wherein the blades are molded onto the arms such that once molded, a blade cannot move on its respective arm.

7. A food mixing attachment for a mixer, comprising:

at least two mixing arms depending down from an engagement member that is configured for engaging the mixer such that the mixer can move the attachment when the mixer is activated; and a respective flexible blade molded onto at least one arm and made separately therefrom, the blade having a contour generally like at least a portion of a top to bottom contour of a bowl, whereby the blade scrapes food from the bowl surface when the bowl is operably engaged with the mixer, food is in the bowl, the engagement member is engaged with the mixer, and the mixer is activated, wherein the blade is held onto the arm without fasteners, wherein the blade is curved in a top-to-bottom dimension defined by the bowl and is also curved in an azimuthal dimension that is orthogonal to the top-to-bottom dimension.

8. The attachment of claim 7, comprising a blade on each arm, wherein the blades are rubber.

9. The attachment of claim 7, wherein the arms are plastic.

10. The attachment of claim 7, wherein each arm is formed with at least one opening, a portion of a respective blade extending into the opening.

11. The attachment of claim 7, wherein each arm includes a respective shoulder segment extending between the engagement member and the respective scraper segment, the shoulder segments being substantially horizontal when the attachment is engaged with the mixer and the bowl is positioned beneath the turning component of the mixer with the attachment extending into the bowl.

* * * * *

(12) EX PARTE REEXAMINATION CERTIFICATE (9004th)
United States Patent
Fallowes et al.

(10) Number: US 7,314,308 C1
(45) Certificate Issued: May 8, 2012

(54) MIXING BOWL WITH ATTACHMENT

(75) Inventors: Gary Fallowes, San Diego, CA (US); William Tan, Singapore (SG); David Robert Goetz, Los Angeles, CA (US)

(73) Assignee: Shelter Rock LLC, Wilmington, DE (US)

Reexamination Request:
No. 90/010,575, Jun. 18, 2009

Reexamination Certificate for:
Patent No.: 7,314,308
Issued: Jan. 1, 2008
Appl. No.: 11/085,741
Filed: Mar. 21, 2005

(51) Int. Cl.
*B01F 9/12* (2006.01)
*B01F 9/16* (2006.01)

(52) U.S. Cl. .......... 366/310; 366/313; 366/343
(58) Field of Classification Search ............ None
See application file for complete search history.

(56) References Cited

To view the complete listing of prior art documents cited during the proceeding for Reexamination Control Number 90/010,575, please refer to the USPTO's public Patent Application Information Retrieval (PAIR) system under the Display References tab.

*Primary Examiner* — Krisanne Jastrzab

(57) ABSTRACT

A food mixing attachment includes two mixing arms extending down from an engagement member that is configured for engaging a mixer. A respective flexible blade is on each arm and has a contour generally like that of a bowl. During the mixing process the blades scrape food from the bowl surface into the interior of the bowl.

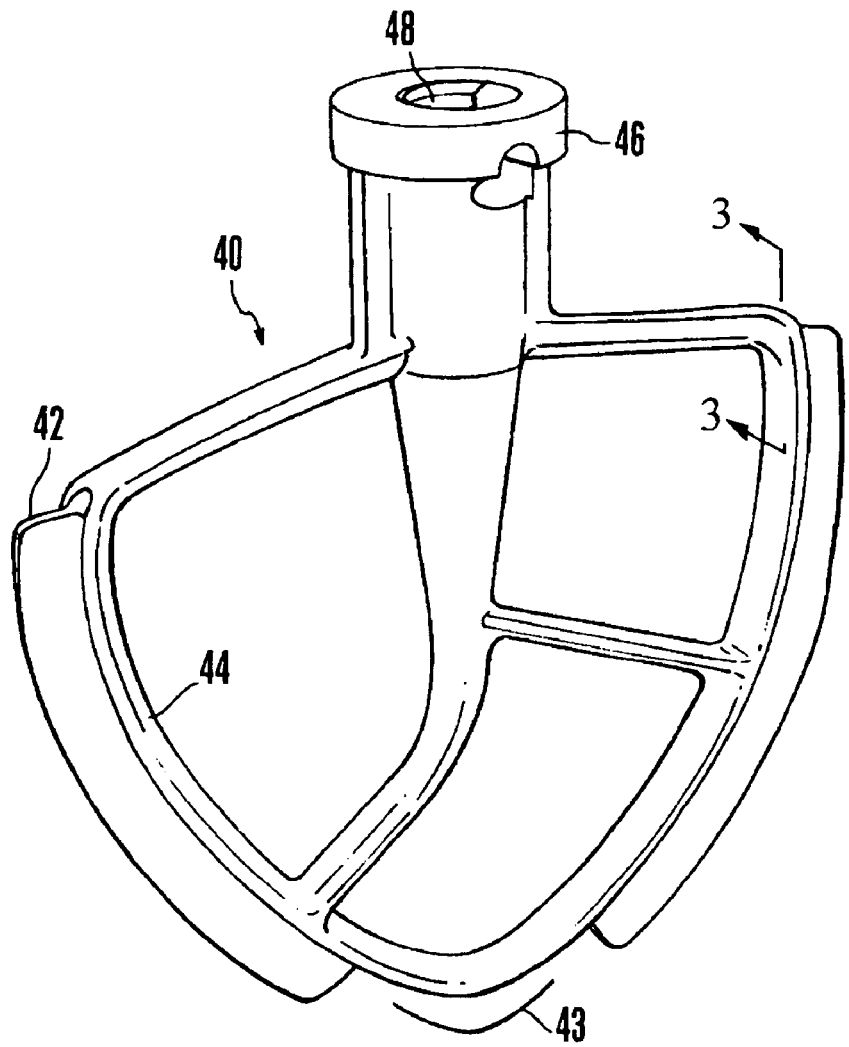

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11 are cancelled.

New claim 12 is added and determined to be patentable.

*12. A mixing attachment for a mixer for mixing food in a bowl having curved side and a bottom, comprising:*

*an upper engagement member configured for releasably engaging a turning component of the mixer, such that when the upper engagement member is engaged with the turning component and the mixer is activated, the upper engagement member moves;*

*two and only two substantially horizontal shoulder segments connected to said upper engagement member and extending in opposite directions from said upper engagement member;*

*an arm depending down from the end of each of said shoulder segments wherein each arm includes a respective scraper segment contoured generally complementarily to the side of the bowl, the scraper segments joining each other at a bottom of the attachment, the bottom of the attachment being juxtaposed with the bottom of the bowl when the attachment is engaged with the mixer and the bowl is positioned beneath the turning component of the mixer with the attachment extending into the bowl;*

*a respective resilient blade engaged with each scraper segment along a substantial length thereof and being spaced from each other at the bottom of the attachment, the blades bearing at least one of the following relationships when the attachment is engaged with the mixer and the bowl is positioned beneath the turning component of the mixer with the attachment extending into the bowl:*

*riding against the side of the bowl, and being closely spaced from the side of the bowl, wherein the arms are curved in a top-to-bottom dimension defined by the bowl and are also curved in an azimuthal dimension that is orthogonal to the top-to-bottom dimension; said attachment having strengthening means one end of which being permanently attached to one of said scraper segments; and,*

*said blades each having a base attached to its respective scraper segment and being tapered from said base in a transverse dimension;*

*each of said blades being molded onto its respective said scraper segment.*

\* \* \* \* \*